United States Patent [19]

Case et al.

[11] Patent Number: 4,733,969
[45] Date of Patent: Mar. 29, 1988

[54] LASER PROBE FOR DETERMINING DISTANCE

[75] Inventors: Steven K. Case; Robert E. Keil, both of St. Louis Park; John Konicek, Minneapolis, all of Minn.

[73] Assignee: CyberOptics Corporation, Minneapolis, Minn.

[21] Appl. No.: 904,882

[22] Filed: Sep. 8, 1986

[51] Int. Cl.⁴ .............................................. G01C 3/08
[52] U.S. Cl. ......................................... 356/375; 356/4
[58] Field of Search ........................... 356/4, 372, 375; 250/227

[56] References Cited

U.S. PATENT DOCUMENTS

| | | | |
|---|---|---|---|
| 3,497,289 | 2/1970 | Oberheuser | 350/182 |
| 3,661,465 | 5/1972 | Groh | 356/375 |
| 3,799,652 | 3/1974 | Torquet | 350/161 |
| 4,017,160 | 4/1977 | Betensky | 350/182 |
| 4,059,343 | 11/1977 | Kowalski et al. | 350/182 |
| 4,084,881 | 4/1978 | Hirabayashi et al. | 350/6.8 |
| 4,170,401 | 10/1979 | Yoder, Jr. et al. | 350/173 |
| 4,436,260 | 3/1984 | Donelan | 244/3.16 |
| 4,488,813 | 12/1984 | Kissinger et al. | 356/375 |

FOREIGN PATENT DOCUMENTS

WO 85/01119 3/1985 PCT Int'l Appl.

*Primary Examiner*—Eugene R. LaRoche
*Assistant Examiner*—Robert J. Pascal
*Attorney, Agent, or Firm*—Dorsey & Whitney

[57] ABSTRACT

A laser based optically triggered sensor system is described which can function as a coordinate measuring machine (CMM) probe. With the sensor, a CMM can find the exact location of the surface of a test object without physically having to touch the object. The reflectivity of the laser beam is sensed by a detector pair. The ratio of light on the detector pair is sensed and used to indicate when the probe is in range for a measurement, out of range for the measurement, and when in range, whether the object being sensed is too far or too close from the trigger point of the probe. The system is a plug compatible replacement for existing contact trigger probes currently used on most CMM's.

18 Claims, 10 Drawing Figures

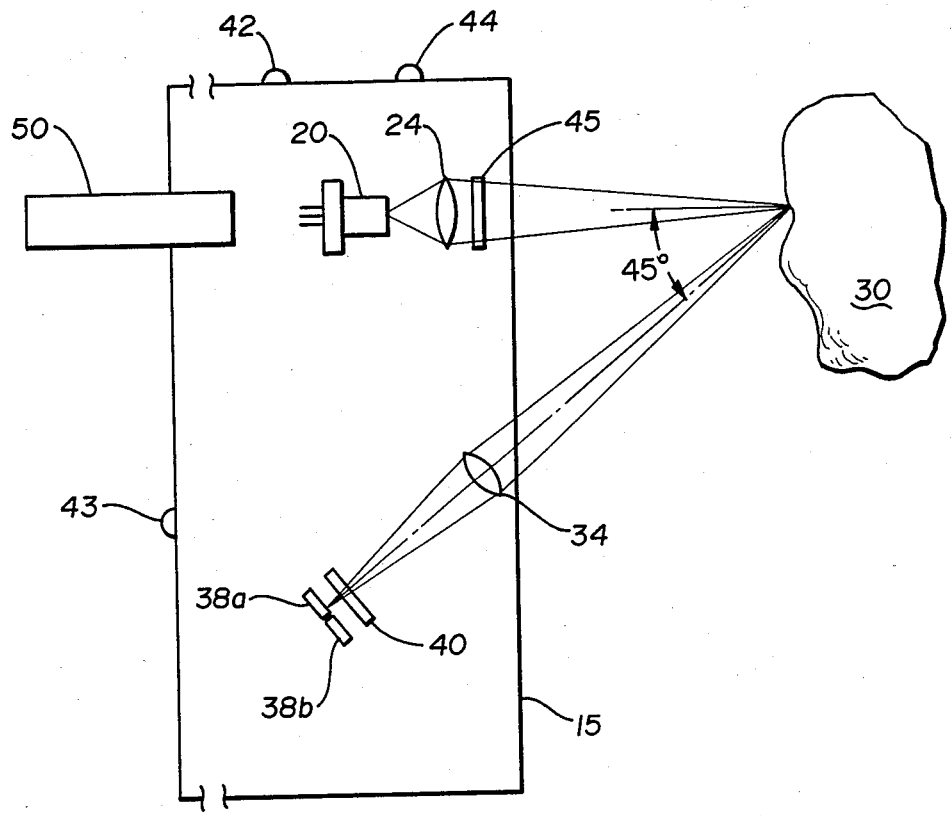
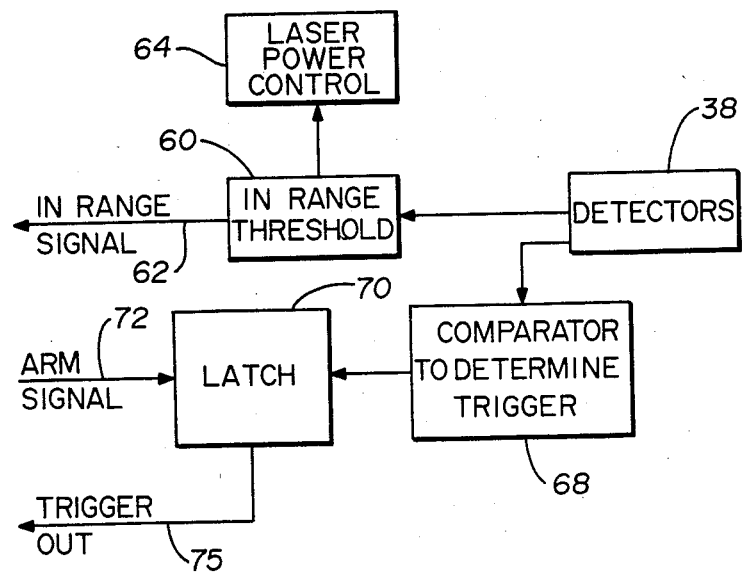

Fig. 4c
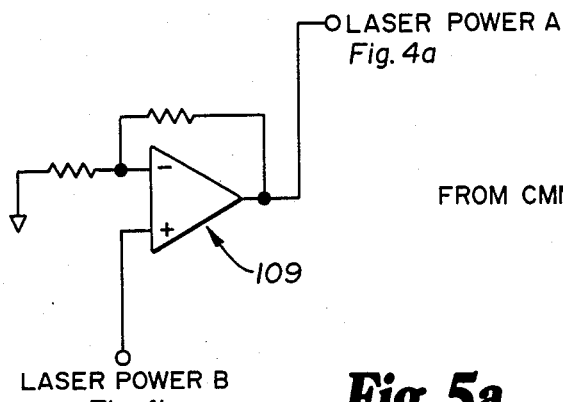
Fig. 4e
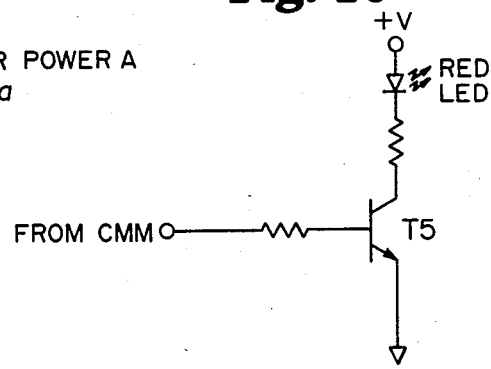
Fig. 5a
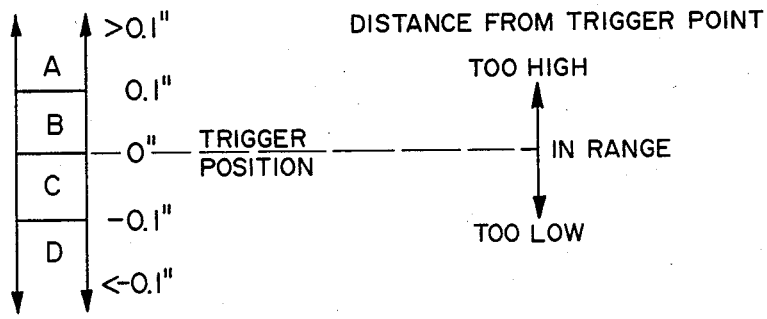
Fig. 5b
| POSITION | GL GREEN LT IN RANGE | ITS INTERNAL TRIGGER SIGNAL | AS ARMING SIGNAL | RED LIGHT CMM | RED LIGHT OTHERS | LATCHED TRIGGER OUT T2 |
|---|---|---|---|---|---|---|
| A | 0 | 1 LATCHED UNTIL C IS REACHED | X | ITS·AS | ITS | 0 |
| B | 1 | 1 LATCHED UNTIL C IS REACHED | X | ITS·AS | ITS | 0 |
| C | 1 | 0 LATCHED UNTIL B IS REACHED | X | ITS·AS | ITS | 1 |
| D | 0 | 1 LATCHED UNTIL B IS REACHED | X | ITS·AS | ITS | 1 |

LASER PROBE FOR DETERMINING DISTANCE

BACKGROUND OF THE INVENTION

The field of the invention is high precision probes that measure the distance to the surface of a test object. More particularly, the invention relates to high precision laser based measuring systems and associated optics and electronics to perform such distance determinations relating to the surface of a test object.

A preferred embodiment of the device is designed to be used with currently manufactured Coordinate Measuring Machines (CMM's). Coordinate Measuring Machines are used by many manufacturers, worldwide, to precisely determine if manufactured parts are in tolerance. The location of faces on parts, holes, screw threads, etc. can be precisely determined via the use of Coordinate Measuring Machines. Such machines usually have probes which must contact the surface of a part to be tested. A leading manufacturer of ruby tipped mechanical probes which physically contact test surfaces is Renishaw Electrical, Ltd. an English company.

In operation, the tip of the sensor is moved around in space by attaching it to the arms of a Coordinate Measuring Machine. The arms allow free travel of the sensor in all three dimensions and contain encoders which allow one to precisely determine the exact position of the probe tip in space. Typical resolution for a Coordinate Measuring Machine is 0.00001" or alternately 0.1 mil (2.5 micrometers).

Coordinate measurement is accomplished as follows. The three-dimensional part is mounted onto the measurement table. The arm of the Coordinate Measuring Machine is moved so that the tip of the contact probe comes down and touches the surface of the part. When the part is touched, the tip of the probe is deflected slightly and opens an electrical contact. When the contact is broken, encoders in the Coordinate Measuring Machine arms are electronically locked so that they maintain their readings even if the arm overshoots. A computer then reads the three axis coordinates where the part surface was encountered. By this means, the exact location of one point on an object, the X, Y, Z coordinate of the point in space, can be determined. Subsequent points on the part are measured in a similar manner until a sufficient number of points are measured, and the critical parameters of the part have been determined, to see if it is in tolerance.

A disadvantage of the contacting probe tip is that it does not work for flexible parts such as thin metal pieces, plastics, any kind of liquid, or other soft, deformable materials such as a foam product or clay, which could be deformed via the measurement process.

An additional disadvantage of the contacting method is that the probe tips typically have a small ruby sphere attached to the end. The diameter of the sphere is well known, so that its radius can be compensated for in the measurement process but, nonetheless, the radius of this sphere is inherently large (with 0.050" being an example). This means that an object with very fine detail cannot be measured by standard probe tips, because the probe tip is too large to reach into small features of complex objects. If smaller probe tips are made in order to extend into small crevices and similar areas, then the pressure from a sharpened tip that is exerted onto a part will be such as to severely dent or distort the part at the measurement point, giving false readings.

Contacting probes have another disadvantage. Because they mechanically contact the part, they have to be retracted away from the part before they can be moved laterally so that the probe tip is not dragged along the part surface.

All these disadvantages are overcome by the use of the disclosed laser-based, non-contact sensor system.

SUMMARY OF THE INVENTION

The instant invention is designed to be physically plug compatible with currently manufactured Coordinate Measuring Machines and currently manufactured contact probes. The invention produces an optical trigger signal which, when received by the coordinate measuring machine, is electrically equivalent to the contact of the piece by the ruby tipped mechanical probe.

The sensing mechanism is produced by a laser light source, such as a laser diode, and one or more lenses which focus the light on the surface of the object.

A receiving lens detects the spot of laser light and focuses it in a manner to scan a solid state light detector pair. As the reflected light is focused on the first detector of the pair, an "in range" signal is generated by associated electronics and an audio-visual indication is generated for the operator, such as the lighting of an LED, to alert the operator that the trigger point or measurement point is about to be reached. Such an expedient is not possible with mechanical probes. As the focused light falls equally on the two detectors of the detector pair, or in a predetermined proportion, the trigger point has been reached and a signal is generated to the CMM that the coordinate measurement should be taken and a primary function of the invention has been achieved.

In the event of manual operation of the Coordinate Measuring Machine, where overshoot of the measurement point is possible, light focused on the second detector of the detector pair continues to indicate that the sensor head is still "in range" of the measurement position. As the focused light beam passes from the second detector of the detector pair, the in range light is extinguished so that the operator does not contact the surface.

As a consequence, the laser triggered optical probe is similar in function to a mechanical contacting probe, except that it never needs to touch the part in order to give a trigger signal. The additional capabilty of giving an in-range signal tells the operator that he is getting close to the part surface.

Additionally, the spot size that the laser beam is focused to is only approximately 0.001 inches. Therefore, a very small probe point is used and very complex, small detail objects can be probed. The laser beam, of course, can also be moved laterally across the surface without any drag, which provides alternative means of detecting contoured surfaces. This ability can also at least double the data gathering rate of a Coordinate Measuring Machine. Additionally, the laser beam will cause no perturbation to the surface via the measurement process; hence it is suitable on soft, deformable materials such as clay, thin sheets and the like.

The response speed of the laser base sensor is also extremely fast and the system is accurate. Response speed is approximately 100 microseconds for a trigger signal and the accuracy is in the 0.00001 inch range.

These and other objects and advantages of the invention will become apparent to those skilled in the art upon a review of the Description of the Preferred Embodiment of the Invention and the accompanying drawings and claims.

DESCRIPTION OF THE DRAWINGS

FIG. 1 is a schematic drawing of the optical system, the light source and the detector pair which senses the position of the object in order to generate the trigger signal.

FIG. 3 is a block diagram of the electronics of one embodiment of the invention.

FIG. 4, comprising FIGS. 4a–4e, show electronic circuits used in the invention. FIGS. 4a and 4b are the minimum normally required for an operational device, the remaining circuits are enhancements for different features and functions of the invention.

FIGS. 5a and 5b, set forth a logic table identifying the operation of a preferred embodiment of the invention.

DESCRIPTION OF THE PREFERRED EMBODIMENT

Figure 2:
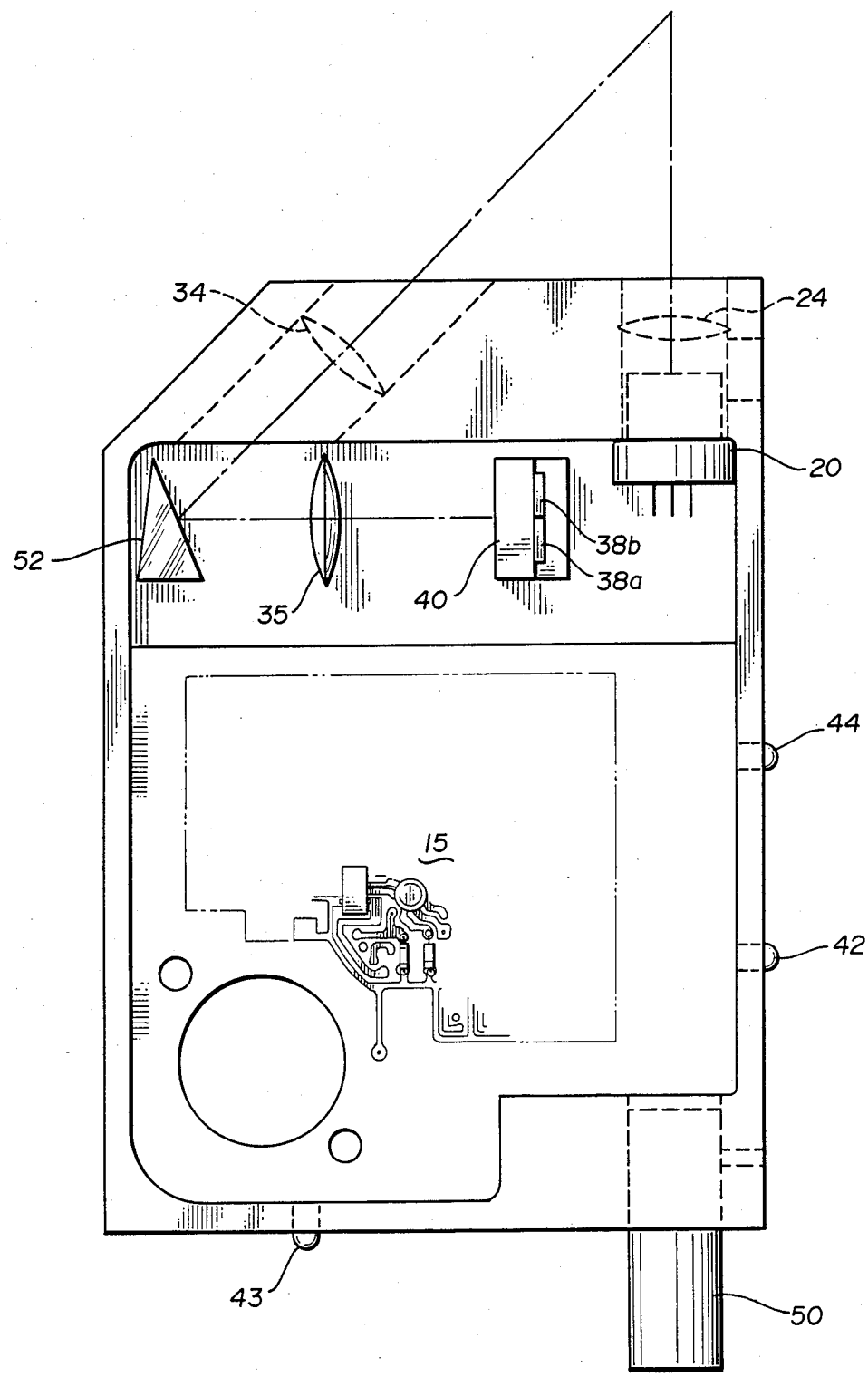
FIG. 2 is a similar mechanical schematic which shows a slightly different optical arrangement to enhance the compactness of the sensor head.

Shown in FIG. 1 is a mechanical schematic of one form of the invention. In a preferred embodiment for use with current Coordinate Measuring Machines (CMM) a measurement is initiated by receipt of an arming signal from the CMM indicating its computer is ready to make a measurement. Although its predominant emission is infrared, the laser 20 diode also preferably emits light in the visable spectrum so the target is visible to the operator. The light is focused by the source lens 24, which can be a three element lens of conventional manufacture, onto the surface of the object 30 to be tested establishing a focused point of light approximately one thousandth of an inch in diameter. The light is reflected from the object 30 surface and imaged with a receiving lens 34 onto a detector pair 38a,b located within the sensor head 15. The two detectors 38a,b must be extremely close together and, in fact, are conventionally fabricated by companies such as United Detector Technology on a single piece of silicon with a separation of approximately 0.005".

Referring to FIG. 1, the ray which passes through the center of a lens 34 is not deviated. Using this principle, if the object 30 is too far away, the light entering the receiver optical system 34 will be focused on a position which is beyond detector segment No. 1, 38a; therefore, very little light will fall on either detector 38. In this condition, there will be no in range signal and the sensor 15 will remain inactive. The laser 20 power may be adjusted up to maximum intensity as the detector 38a tries to receive a signal.

As the sensor 15 moves closer to the object 30, the image of the laser spot moves such that a fair amount of light first falls on detector No. 1, 38a. When this detector 38a has a sufficient amount of light focused on it, the "in range" signal will begin. As the sensor 15 moves continually closer to the object 30, the image of the laser spot moves across detector No. 1, and approaches the junction between detectors No. 1 and No. 2, 38a, b.

When the detector 38 signals are equal (that is equal amounts of energy are falling on detector No. 1 and detector No. 2 in the pair), the trigger point is reached and the CMM receives the signal to store the coordinate measurement.

A number of expedients are used, or can be used, to address environmental effects on the probe's, 15 accuracy. For example, visable light is preferably emitted by the laser 20 so that the operator can see the target spot. However, the predominate energy emitted is preferably in the near infrared and a filter 40 is preferably used which blocks all visable light so that the sensor 38 is blind to ambient illumination. In conditions where incandescent ambient lighting is used, rather than fluorescent which is preferred, or if the object 30 surface is grossly out of focus so that the noise in the system yields nearly equal signals on the two detectors 38a,b, it is not necessary to have equal signals on the detectors 38a and b to have the trigger point, which might be triggered by equal amounts of incandescent light, or noise, falling on the detectors, 38. Any other fixed signal ratio can be chosen by adjustment of the reference potential of the operational amplifiers referred to in connection with FIG. 4.

After the trigger signal is given, the arming light 42 is subsequently extinguished (by CMM software) at the point where the two signals are equal or in the predetermined proportion. If the sensor head 15 then moves too close to the object 30, the image falls predominantly on detector No. 2, 38b. While the trigger has been given, because the sensor is too close, the in range signal 44 remains on. If the object moves much too close, the light falls off detector No. 2, 38b, and the in-range signal 44 is extinguished.

The laser 20 power is maintained such that a desirable signal level falls on the detector pair 38. The light may be turned down for extremely shiny objects, which would put too much light into the detector 38, and turned up for dull, diffusely reflecting or absorbing objects, which do not return much light to the detector 38.

A cylindrical lens 45 may optionally be added to the sensor 15 which will serve to make the illumination pattern a small stripe with a 10 to 1 aspect ratio instead of a point on the object 30. It is preferable that the stripe be in the direction so that its long axis is vertical relative to the schematics in the drawings. The advantage of doing this is that one can do a small amount of "averaging" over the test surface and in this way can compensate for some of the microstructure in the surface, scratches or other surface roughness, which is always a factor which limits accuracy in laser-based, non-contact range sensors. If the line is fairly short, then the sensor 15 is still measuring a small area on the object 30. Therefore, a compromise can be made on the length of a line produced by the cylindrical lens 45. A size of approximately 0.010" in length of the line segment (with the laser beam then being 1 by 10 mils) would be a reasonable size.

The entire sensor head 15 is mounted via a rod 50 which is axially aligned with the laser beam. Three indicator lights 42–44 are on the sensor head. One light 43 is a "laser on" indication which is required by federal law; another light 42 is the red "armed" signal; and the third light 44 is the green "in-range" signal.

Electrically, the sensor can be made pin compatible with a Renishaw mechanical triggering probe by maintaining equivalent voltages for the arming signal to the sensor 15 and the trigger output.

FIG. 2 shows a second mechanical schematic of an alternative embodiment of the physical layout of the laser source 20 and detectors 38 and optic system. Using the arrangement shown in FIG. 2, a compact sensor head 15 can be constructed using two focusing lenses 34,35 and a reflecting mirror 52 so that the entire optical system can be included in a housing portion which is less than 1½ by 3 inches. The principal of operation and mounting of the compact sensor head 15 is substantially the same as that described for the first embodiment.

While a 45° angle has been shown as the angle for the receiving lens 34 to maximize the rate of scanning of the focused layer beam past the detector pair 38, it will be understood that other angles may be employed to achieve the objects of the invention.

FIG. 3 shows a block diagram of electronics for the sensor system. The detectors 38 are a central feature. If a sufficient signal is present on one of the detectors 38, the in-range threshold 60 is achieved and the "in-range" signal 62 is given.

The laser power is also set with a laser power control circuit 64 to give a satisfactory signal from the detector pair 38. A comparison is made of the power focused on the detectors 38, and if these signals are equal, then the trigger signal 75 is given by a comparator circuit 68 which may be latched with a latch 70 as discussed below. If the sensor is armed via software, then the internally latched trigger signal can be logically combined with the arming signal 72 to extinguish the red arm/-triggered light.

Figure 4A:
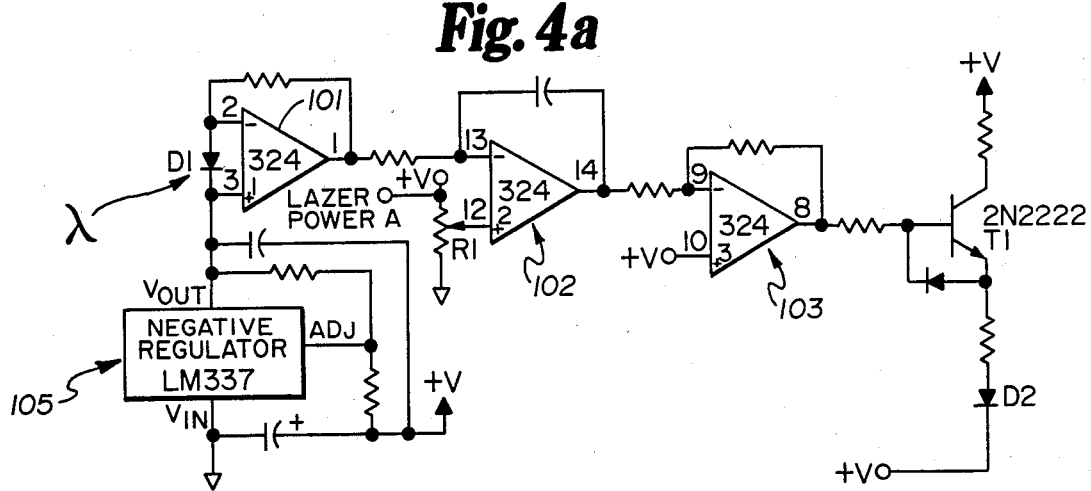
Figure 4B:
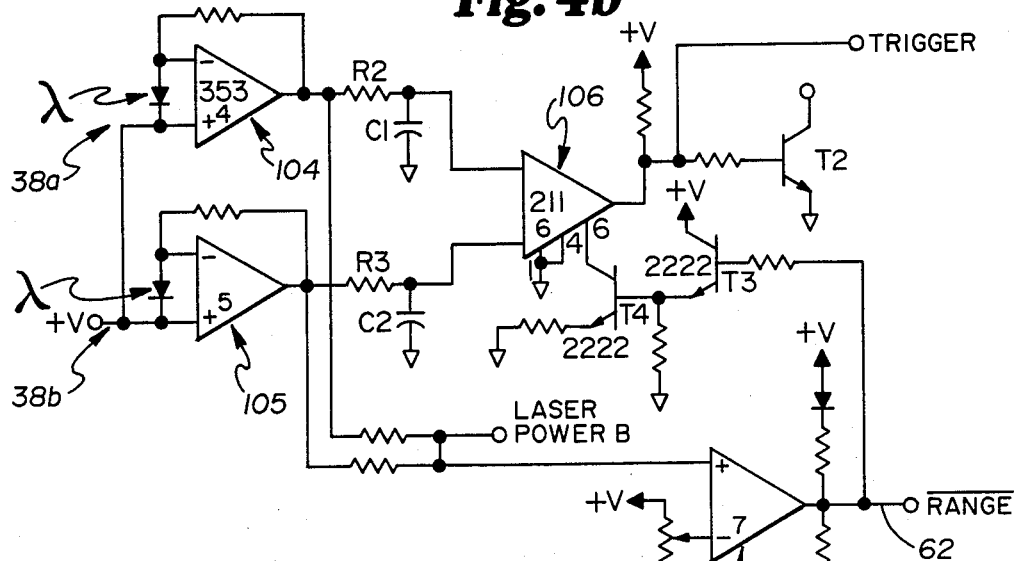

FIG. 4 shows the schematic diagrams for the optical trigger. FIG. 4a is the circuit which controls the laser diode 20 power output. The schematic diagram of FIG. 4b is the circuitry which receives power from the dual photo detector 38 and generates the trigger signal 75 and the in-range and out-of-range signals 62.

Referring to FIG. 4a, the power level circuitry uses as its feedback signal the output from diode D-1, which is packaged as part of the laser diode 20. This signal is amplified by a transconductance amplifier, operational amplifier No. 101, which is then fed into an integrator, operational amplifier 102. The output of the integrator is then buffered and amplified by an operational amplifier 103 and transistor T-1, to provide a controlled current to the laser diode D-2. This current is determined by the reference level adjusted on potentiometer R-1, which is compared to the signal from the operational amplifier 101, and is proportional to the amount of light emitted by the laser diode D-2. If the signal either increases or falls off in intensity, an error signal is generated on the output of the integrator, operational amplifier 102, which is in the opposite direction of the increase or decrease of light current and, therefore, corrects the condition back to the set level, which is adjusted on potentiometer R-1. A negative voltage regulator 120 is used to provide a bias voltage for the photodiode D-1 and to enable operation of this circuitry from a single 12-volt supply.

The detector 38 circuitry of FIG. 4b, which is used to actually measure the trigger 75 and range 62 signals, utilizes two transconductance amplifiers, operational amplifiers 104 and 105. The outputs from these amplifiers 104,105 are filtered through a low-pass filter made up of resistors R-2 and R-3 and capacitors C-1 and C-2. These two filtered signals are fed to the inputs of a differential comparator, operational amplifier 106. The output of comparator operational amplifier 106 changes state as the relative magnitude of its two input voltages from operational amplifiers 104 and 105 change due to a shifting of the incoming light on the photodiode pair 38a,b. The output of the comparator operational amplifier 106 drives an open collector transistor T-2, either directly as shown in FIG. 4b or through a latch 70 as shown in FIG. 4c, which provides the trigger signal 75 to the Coordinate Measuring Machine.

Operational amplifier 107 looks at the arithmetic average of the outputs from the two photodiodes 35a,b in the photodiode pair 38. This average voltage, corresponding to the amount of light on the photodiode pair 38, is compared to a reference level and used to generate the in-range and out-of-range signals 62. The out-of-range signal 62 drives the base of transistor T-3, which in turn drives the base of transistor T-4, to inhibit the strobe input of comparator operational amplifier 106. This inhibiting is done to disable the trigger signal when the sensor 15 is out of range and there is no appreciable amount of light falling on the photodector pair 38a,b.

Shown in FIG. 4c, is a comparator 109 used for power adjustment of the laser 20. Since the surface that is being detected can vary from very dark to very shiny, power adjustment of the laser beam may be necessary if different objects or an object having varing degrees of reflectivity if being measured.

The power adjustment circuit consists of an operational amplifier 109 which is connected between the output of operational amplifier 105, which measures the output of the first detector 38a of the detector pair 38, and is connected to the reference voltage to the power circuit 64 for the laser 20. As the sensor 15 circuit is armed or activated, the first detector 38a will not detect the laser 20 beam and thus the power adjustment circuit 64 will boost the laser power up to make sure that a dark surface is not being detected. If too much signal is detected because the laser power has been increased too much or if a very reflective surface is being sensed, the reverse process takes place and the laser power is turned down. In this manner the system can be optomized for the most accurate detection.

Shown in FIG. 4e is a CMM arming circuit for the sensor. In the circuit of FIG. 4e only a visual indication is utilized which is received from the CMM. In this circuit the signal from the CMM, which indicates it is ready to take a measurement, is connected through a transistor T5 which, when on, lights a red LED 42 to tell the operator to take the measurement.

Figure 4D:
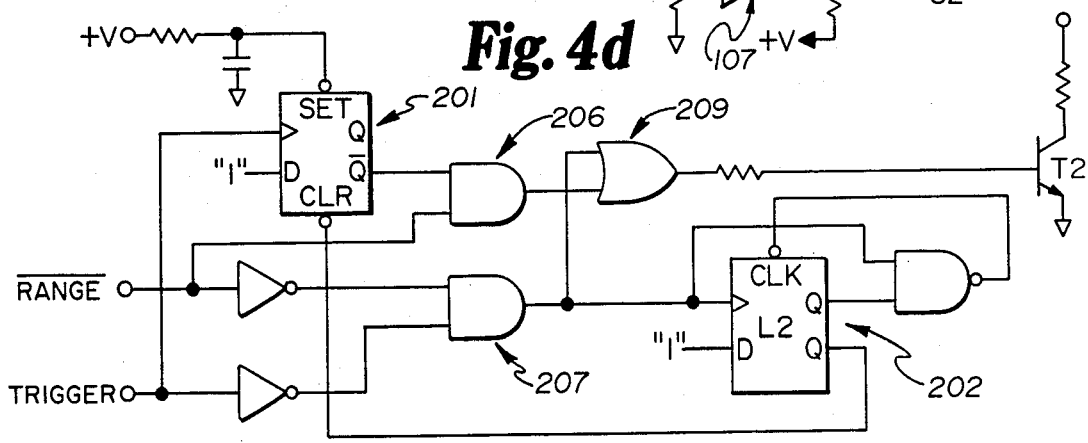

A latching circuit 70 shown in FIG. 4d can be used to provide an internal trigger signal ITS, which is latched in the "on state" to make a measurement until the probe 15 enters zone "C" of FIG. 5a. As soon as the "too far" zones, C and D are reached the event trigger signal will be latched until the probe returns to zone B and the sensor system resets. The internal latch, therefore, maintains the trigger signal until the sensor 15 has moved out of range away from the object 30 to reset the latch for a second measurement. This latch is used to differentiate between out-of-range signals which are too close rather than too far. For example, after the trigger event has occurred, if the sensor 15 is moved even closer to the object 30, the received beam will become predominantly on detector No. 2 38b which will provide an indication of in-range, but with the latch 70 the circuit will remember the fact that the trigger has occurred. If the sensor 15 continues to move towards the object 30, the received laser beam will pass detector No. 2 38b and an out-of-range indication would be present. In this condition with the latch circuit, the sensor will know if it is too close or too far and the operator will know that the last event that happened is that the sensor 15 was too close to the object 30.

The latch circuit shown in FIG. 4d, utilizing D-latches, 201 and 202, is provided to remember the trigger event after the sensor 15 goes out of range in the too close position. This is accomplished by setting latch 201 upon the trigger event and then using latch 202 as a one shot to clear the first latch 201 when the sensor 15 again enters the correct range, the too far condition. This circuitry then takes the latched signal and uses that with the corresponding combinational logic to arrive at the condition that is required by the CMM user. This condition requires that transistor T2 be closed or on during the time that the sensor 15 is out of range from the too far condition and also in range before the trigger event occurs. The condition is logically determined by the two AND gates 206,207 and the OR gate 209 which drive the base of transistor T2. The circuitry also provides a zero signal or open collector signal to the CMM system after a trigger has occurred and any time the sensor 15 is in or out of range, when the sensor is too close to the part 30 being measured.

Finally, with an AND gate (not shown) connected to the internal latch signal and the arming signal complete fail-safe operability of the sensor 15 can be assured since the trigger event will not take place until after (1) the internal latch has conditioned the circuit to take a measurement, and (2) an arming signal from the CMM has been received.

A final embodiment of the invention would use neither the internal latching signal nor the arming signal and could be used in a scanning mode for detailed placement work of, for example, surface mounted microchips on a substrate. For larger measurements of objects having a profile of greater than 1/10th of an inch, the in-range signal 62 can be detected with the range set above the bottom surface being detected and having the profiled surfaces "in-range". For microchips and other measurements of less than 1/10th of an inch, the in-range signal can be established at the bottom surface and the profile of the microchips be detected by the output of the trigger signal 75. These and other varied uses of the invention will become obvious to those skilled in the art upon a consideration of the structure and operation of the invention.

In operation, the sensor 15 works as follows. The sensor 15 is mounted on the arm of a Coordinate Measuring Machine as a replacement to the contacting probe. The laser probe emits a laser beam which comes to focus approximately 1" outside the sensor housing. This laser beam falls on the surface of the part 30 and light is reflected back toward the receiver optics 34. As the part surface is approached, the CMM first gets an indication from the sensor 15 that it is within a short distance of the trigger point, for example, approximately one tenth of an inch. This is referred to as the "in-range" signal 62, meaning "you're close." This signal is not available with a mechanical contacting probe. The operator can then slow his rate of approach toward the surface, in the same manner as computer-driven Coordinate Measuring Machines, which automatically approach the part surface after they have been taught where the surface should be.

The "in-range" condition is indicated by an electrical signal 62 and a green light 44 indicating that the operator is close to the proper position. An additional red light 42 will already be on which indicates that the probe is armed and ready to take readings, but has not made contact with the surface. On most Coordinate Measuring Machines, the arming signal for the red light 42 is supplied via hardware and software resident in the Coordinate Measuring Machine.

When the sensor 15 is in range and gets closer to the part surface, at some precisely prescribed distance, which is approximately one inch from the sensor disclosed, an electrical trigger will indicate that a precise range has been crossed and detected. This signal is sent to the Coordinate Measuring Machine which will then electrically lock the encoders on the CMM arms and turn the red light 42 off on the sensor head 15 indicating that a trigger has occurred. The signal, therefore, is the equivalent of breaking or opening the contact in a contacting probe.

If one overshoots (that is moves too close toward the part), the trigger signal will remain low, indicating the equivalent condition to the contact being broken for a mechanical probe. When one goes sufficiently close to the part, the in-range signal 62 will also go off. For the current sensor, this occurs when the trigger point is overshot by approximately one-tenth of an inch.

FIG. 5, is a diagram of the logic signals involved in the trigger operation which are discussed above. Four distinct zones are utilized as shown in FIG. 5a. Zone A is when the probe is too high or too far away from the trigger point. Zone B is where the signal is falling on detector No. 1 and the sensor is in range for a measurement, but still too high. The trigger point is in the middle. Zone C is where light would be impinging primarily on detector No. 2 and the probe is too close to the object. Zone D is when the sensor is much too close.

The various logic levels for the various electronic signals and lights are indicated in the logic diagram of FIG. 5b.

Having described a specific embodiment of our laser probe and a number of modifications and variations in both structure and operation of the probe, it will be apparent to those skilled in the art that many and various changes and modifications can be made to the specific embodiment described to achieve various of the objectives of the invention. All such modifications and variations which fall within the scope of the appended claims are within the intendment of the invention.

We claim:

1. A laser probe for indicating when a predetermined distance between the probe and an object has been achieved, the laser probe comprising:
    means for creating a laser beam;
    first focusing means for focusing the laser beam on the object;
    a plurality of light detecting means;
    second focusing means interposed between the object and the plurality of detecting means for focusing the light reflected from the object toward the plurality of detecting means; and
    comparison means connected to the detecting means for determining when a predetermined proportion of light is focused on at least two of the detecting means, said comparison means including means for indicating that the predetermined proportion has been detected.

2. The laser probe of claim 1 wherein the comparison means indicates that the predetermined proportion has been detected when there is equal light focused on at least two of the detecting means.

3. The laser probe of claim 1 wherein the plurality of detecting means comprising two detecting means and wherein the comparison means indicates that the predetermined proportion has been detected when equal light is focused on the detectors.

4. The laser probe of claim 1 wherein the probe further comprises means for adjusting the power of the laser beam so that the power of the laser beam will be increased when the object has low reflectivity and the power of the laser beam will be decreased when the object has high reflectivity.

5. The laser probe of claim 1 wherein the probe further comprises reflecting means interposed between the object and the plurality of detecting means, the reflecting means deflecting the reflected light from the object towards the detector means.

6. The laser probe of claim 5 wherein the second focusing means comprises at least one lens interposed between the object and the reflecting means.

7. The laser probe of claim 5 wherein the second focusing means comprises at least one lens interposed between the reflecting means and the detecting means.

8. The laser probe of claim 1 wherein the first focusing means comprises a cylindrical lens for focusing the laser beam on the object in a manner so that the illumination pattern of the beam on the object surface has a nonuniform aspect ratio so that surface irregularities are averaged by the detecting means.

9. The laser probe of claim 1 wherein the laser probe further comprises means for determining when light is focused on any one of the detecting means.

10. The laser probe of claim 9 further comprising means for indicating that the laser probe is in range when light is focused on any of the detecting means.

11. The laser probe of claim 9 wherein the means for indicating that the predetermined proportion has been detected is inhibited until the range indicating means indicates that the sensor is in range.

12. The laser probe of claim 1 wherein the laser means comprises latch means for recording that the predetermined proportion has been detected.

13. The laser probe of claim 9 further comprising a latch means which is set when the in range signal has been received and the comparison means indicates that the predetermined proportion has been detected.

14. The laser probe of claim 13 wherein the latch means is not reset until the laser probe is withdrawn from the object and the in range signal indicates that the laser probe is again in range.

15. A method of making a distance measurement when a laser probe having means for creating a laser beam is a predetermined distance away from an object, the method comprising:
    focusing the laser beam on the object;
    positioning a plurality of detecting means at a predetermined angle from the laser beam;
    focusing the reflected laser beam toward the plurality of detecting means;
    comparing the amount of light falling on at least two of the detecting means; and
    generating a trigger signal to indicate that the distance measurement is to be taken when a predetermined amount of light is focused on at least two of the detecting means.

16. The method of claim 15 wherein the method further comprises generating a signal to indicate that the laser probe is in range when light is focused on any one of the detecting means.

17. The method of claim 16 further comprising:
    latching the trigger signal when the in range signal is present; and
    resetting the latch only after the in range signal has changed states and a second in range signal is generated.

18. The method of claim 16 further comprising inhibiting the generation of the trigger signal until the in range signal is generated.

* * * * *